US012611604B2

(12) United States Patent
Chen et al.

(10) Patent No.: US 12,611,604 B2
(45) Date of Patent: Apr. 28, 2026

(54) COMPETITION EVALUATION SYSTEM AND EVALUATION METHOD

(71) Applicant: Cloud Latitude Co., Ltd., Taichung (TW)

(72) Inventors: Wei Chen, Taichung (TW); Hsien-Cheng Wu, Taichung (TW)

(73) Assignee: CLOUD LATITUDE CO., LTD., Taichung City (TW)

( * ) Notice: Subject to any disclaimer, the term of this patent is extended or adjusted under 35 U.S.C. 154(b) by 295 days.

(21) Appl. No.: 18/479,574

(22) Filed: Oct. 2, 2023

(65) Prior Publication Data

US 2025/0108309 A1     Apr. 3, 2025

(51) Int. Cl.
*A63F 13/45*        (2014.01)
*A63F 13/65*        (2014.01)
*A63F 13/79*        (2014.01)
*A63F 13/828*       (2014.01)

(52) U.S. Cl.
CPC ............. *A63F 13/828* (2014.09); *A63F 13/45* (2014.09); *A63F 13/65* (2014.09); *A63F 13/79* (2014.09)

(58) Field of Classification Search
None
See application file for complete search history.

(56) References Cited

U.S. PATENT DOCUMENTS

2003/0199315 A1 * 10/2003 Downes P.E. ...... G07F 17/3288
                                                     463/28
2010/0093415 A1 * 4/2010 Kasten .................... A63F 13/12
                                                     463/9

OTHER PUBLICATIONS

Fantasy Premier League, "How the FPL Bonus Points System works", https://www.premierleague.com/en/news/106533, Jul. 10, 2023 (Year: 2023).*
ESPN Fantasy Baseball, "Games Started / Pitching Limits", Wayback Machine, https://web.archive.org/web/20200919025253/https://support.espn.com/hc/en-us/articles/360025379951-Games-Started-Pitching-Limits, Sep. 19, 2020 (Year: 2020).*

* cited by examiner

*Primary Examiner* — Damon J Pierce
(74) *Attorney, Agent, or Firm* — MUNCY, GEISSLER, OLDS & LOWE, P.C.

(57) ABSTRACT

A competition evaluation system and an evaluation method that provide a user unit for a plurality of players to respectively create a competition member list. The competition member list is generated by selecting at least one of a plurality of competition members by the player. The competition members respectively have a competition result and an appearance information, and each of the competition members is respectively given a performance score and a contribution degree based on the competition result and the appearance information. The invention uses a statistics unit to positively correlatedly correct the performance score of the competition member based on the contribution degree of each of the competition members to generate a weighted score for the competition member, thereby generating a total score for each of the competition member lists, and performing ranking according to the total score, so that the associated players respectively obtain a competition ranking.

8 Claims, 3 Drawing Sheets

COMPETITION EVALUATION SYSTEM AND EVALUATION METHOD

FIELD OF THE INVENTION

The invention relates to a game system and method, and more particularly to a competition evaluation system and an evaluation method.

BACKGROUND OF THE INVENTION

Fantasy sports is an emerging game that allows people to participate in sports competitions. It is an online game that combines sports knowledge and strategic competition. In addition to enjoying sports events, people can also obtain additional fun from competitive games.

Please refer to FIG. 1. The game operation process of traditional fantasy sports comprises a procedure P1 for selecting competition members, a procedure P2 for determining whether selecting termination, a procedure P3 for obtaining game results, a procedure P4 for calculating scores statistically, and a procedure P5 for generating users ranking list.

Fantasy sports will select a physical sports event played by actual people as the game subject, such as baseball, basketball, football, etc. The competition time of fantasy sports can be a sports event or a seasonal sports events (consisting of a plurality of sports events). Fantasy sports will provide all competition members who can participate in sports events as selection options, and in the procedure P1 for selecting competition members, the player can select at least one competition member to participate in a competition combination of fantasy sports based on the player's own judgment or preference and at the same time based on the settings of fantasy sports.

Then, fantasy sports will perform the procedure P2 for determining whether selecting termination. Fantasy sports will set a deadline before starting the sports event. After the deadline, players cannot change the selected competition members in the competition combination. In the procedure P2 for determining whether selecting termination, fantasy sports will continue to determine whether the deadline has reached. If the deadline has not yet reached, players can freely select to change the competition members in the competition combination. If the deadline has been reached, players are prohibited from changing the competition members in the competition combination.

Then, fantasy sports perform the procedure P3 for obtaining game results. After the sports event has a result, fantasy sports will obtain a competition data of the sports event. The competition data is the sports event results of all the competition members in the sports event.

Then, fantasy sports perform the procedure P4 for calculating scores statistically. Fantasy sports calculates and obtains a statistical score for each of the players' competition combination based on the player's competition combination and the competition data of the sports event. In more detail, each of the competition members will obtain a competition score based on the competition data. Provided that the competition scores of all the competition members in the competition combination are calculated statistically, the statistical score of the competition combination can be known.

Finally, fantasy sports perform the procedure P5 for generating users ranking list. Fantasy sports generates a ranking list based on the statistical score of the competition combination, and the player can obtain specific rewards based on rankings of the ranking list.

As mentioned above in fantasy sports, the competition score of each of the competition members is generated entirely based on a numerical value of the competition data. Although it is quite fair and objective, it does not practically match the actual performance of the competition members. In more detail, in sports events, the two competition members with the same numerical value of the competition data will have the same competition score, but if the playing time intervals of the two competition members are different, the competition member with shorter playing time will obviously have higher actual performance. Obviously, conventional fantasy sports cannot provide appropriate competition scores based on the actual performance of the competition members, and there is room for improvement.

SUMMARY OF THE INVENTION

A main object of the invention is to disclose a system and an evaluation method capable of performing competition rankings based on actual performance of competition members.

In order to achieve the above object, the invention discloses a competition evaluation system to provide a competition game for a plurality of players to play. The competition evaluation system comprises: a display unit, a competition information unit, a user unit, a statistics unit, an information storage unit and a server processing unit. Wherein the display unit displays a game information related to the competition game for viewing by the players. The competition information unit obtains a competition information and a competition data of a pending physical competition. The competition information comprises a plurality of competition members participating in the physical competition. The competition data comprises a competition result and an appearance information of the competition members individually, and each of the competition members is given a performance score and a contribution degree respectively based on the competition result and the appearance information. The user unit is provided for the players to register, log in, amend and store a member information respectively, and the user unit is provided for the players to respectively create a competition member list, and the competition member list is generated by selecting at least one of the competition members by the player.

The statistics unit corrects the performance score of each of the plurality of competition members based on a positive correlation with the contribution degree of the competition member, and the statistics unit generates a weighted score for the competition member. In addition, the statistics unit statistically calculates the weighted scores of all the competition members in each of the competition member lists, thereby generating a total score for each of the competition member lists, and ranking according to the total score, so that the associated players respectively obtain a competition ranking.

The information storage unit is used to store the game information, the competition information, the competition data, the member information, the competition member list and the competition ranking. The server processing unit connects to and controls operation of the display unit, the competition information unit, the user unit, the statistics unit and the information storage unit, and performs transmission and exchange of the game information, the competition information, the competition data, the member information, the competition member list and the competition ranking.

The invention further discloses an evaluation method of the competition evaluation system. Procedures of the evaluation method comprise:

a competition creation procedure S1 for obtaining the competition information of the physical competition to create the competition game;

a member selection procedure S2 for providing a selection time for the players to create the competition member list before starting the physical competition;

a competition pending procedure S3 for waiting for starting and ending of the physical competition;

a data acquisition procedure S4 for obtaining the competition data after ending of the physical competition; and a ranking calculation procedure S5 for calculating and obtaining the total score of each of the competition member lists to enable the players to obtain the competition ranking respectively.

Further, the ranking calculation procedure S5 comprises:

a performance score and contribution degree acquisition procedure S5-1 for obtaining the performance score and the contribution degree;

a score correction procedure S5-2 for correcting the performance score into the weighted score based on the contribution degree;

a member list score calculating procedure S5-3 for statistically calculating the weighted scores of all the competition members in each of the competition member lists to generate the total score; and a ranking procedure S5-4 for ranking according to the total score to generate the competition ranking.

Summing up the above, the invention discloses the competition evaluation system and the evaluation method. After obtaining the competition result and the appearance information of the competition members respectively, each of the competition members can be given the performance score and the contribution degree respectively. Then the statistics unit corrects the performance score based on a positive correlation with the contribution degree to generate the weighted score of the competition member. The weighted score can practically reflect an actual performance of the competition member, so the competition ranking can be generated based on the weighted score, and the players need more solid sports knowledge and strategies to achieve good results, thereby making competition more enjoyable.

DETAILED DESCRIPTION OF THE PREFERRED EMBODIMENTS

The detailed description and technical content of the invention are described below with reference to the accompanying drawings.

Figure 1:
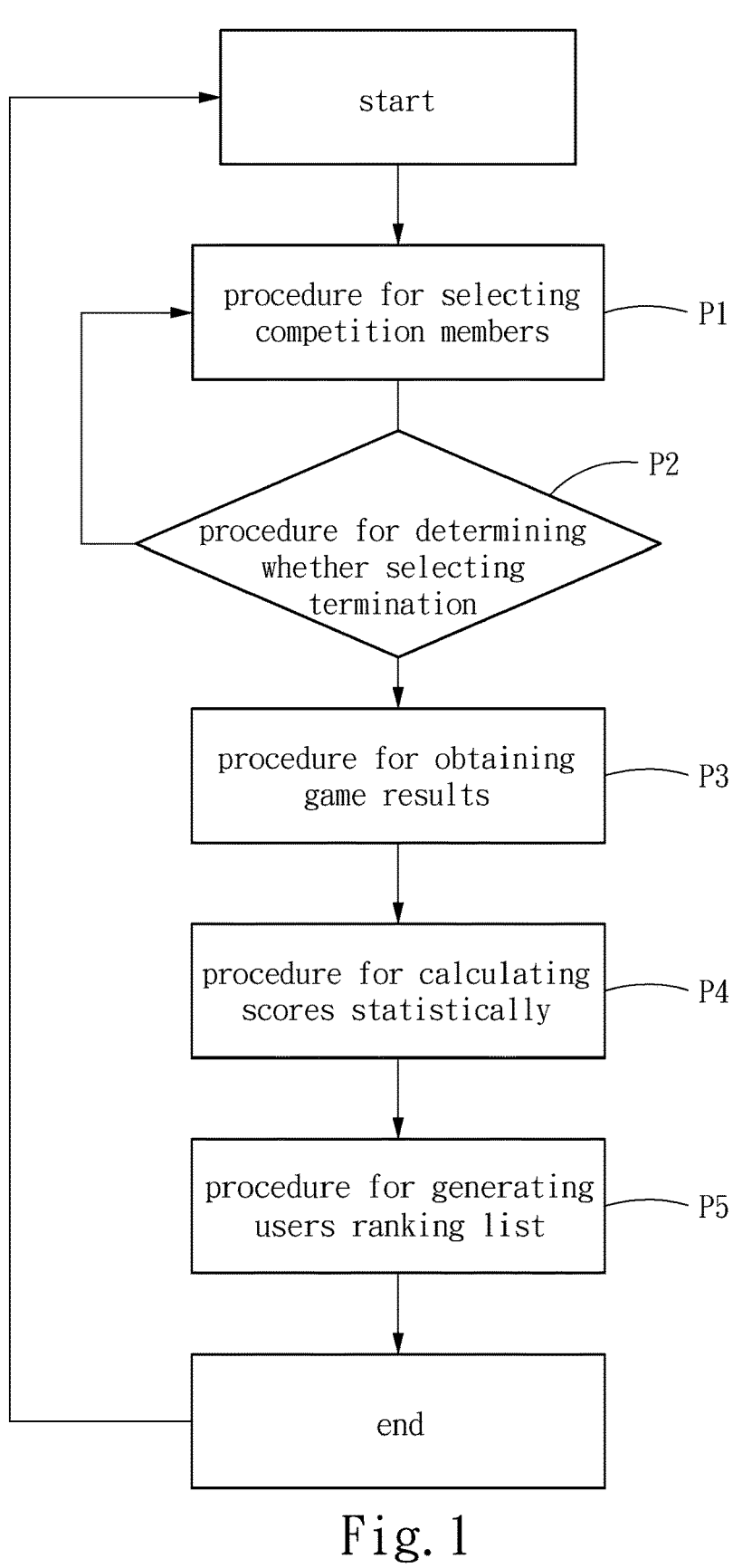
FIG. 1 is a flowchart of operation of a conventional game.
Figure 2:
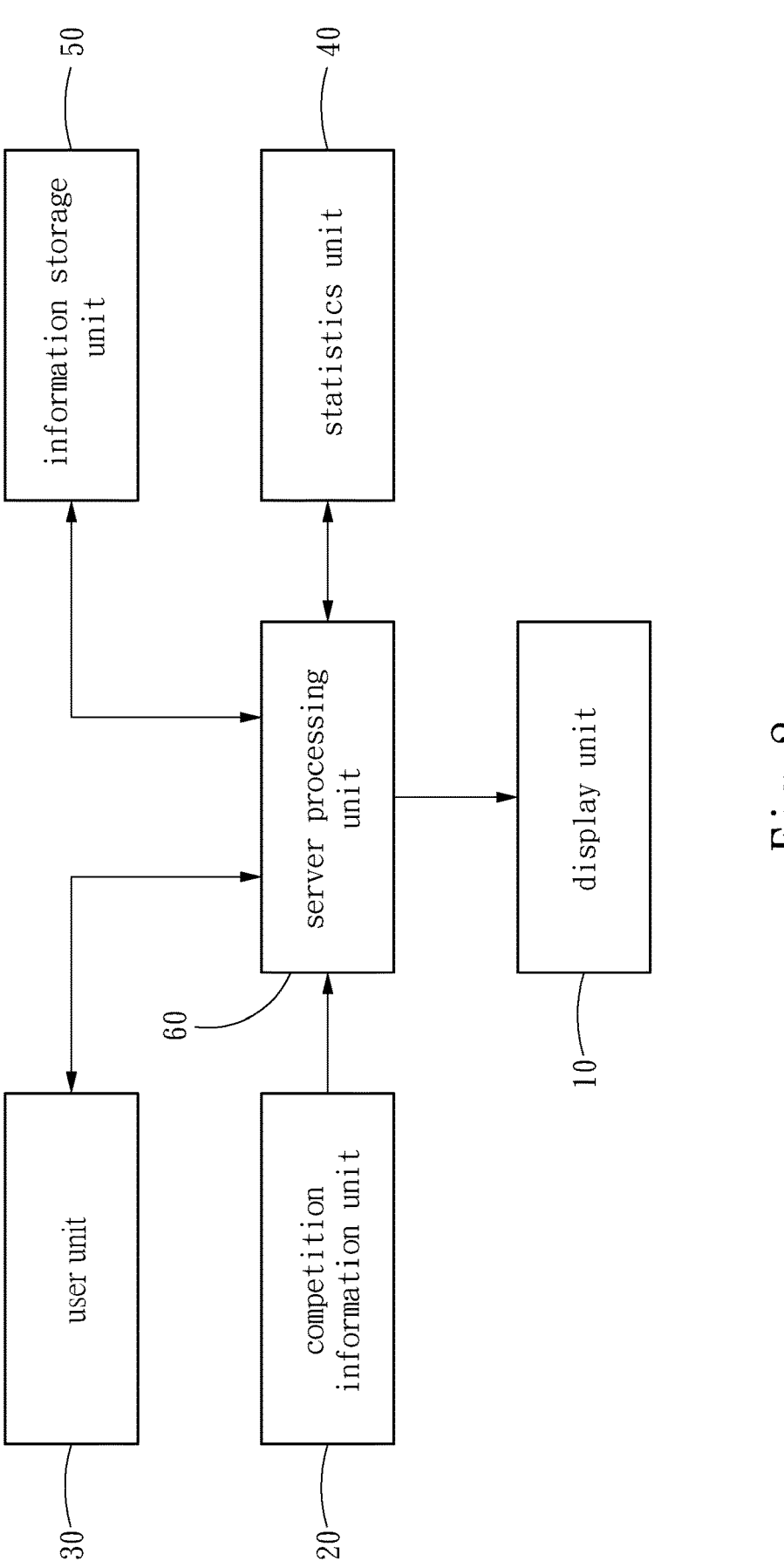
FIG. 2 is an architectural diagram of a game system of the invention.

Please refer to FIG. 2. The invention discloses a competition evaluation system for providing a competition game for a plurality of players to play. The competition evaluation system comprises: a display unit 10, a competition information unit 20, a user unit 30, a statistics unit 40, an information storage unit 50 and a server processing unit 60, wherein the display unit 10 displays a game information related to the competition game for viewing by the players.

The competition information unit 20 obtains a competition information and a competition data of a pending physical competition. The competition information comprises a plurality of competition members participating in the physical competition. The competition data comprises a competition result and an appearance information of each of the competition members, and each of the competition members is given a performance score and a contribution degree respectively based on the competition result and the appearance information.

In one embodiment, the physical competition is a time-based competition, the appearance information is an appearance time, the performance score is correlated to the competition result, and the contribution degree is negatively correlated to the appearance time. For example, the time-based competition can be basketball, football, rugby, volleyball, polo, handball, ice hockey, etc. In this embodiment, when the competition member has less of the appearance time (compared with an average appearance time), it can be inferred that the performance score of the competition member is obtained with less of the appearance time, so the competition member should obtain the higher contribution degree, and therefore the contribution degree is negatively correlated to the appearance time.

In one embodiment, the physical competition is a specified round-based competition, the appearance information is a number of rounds played, the performance score is correlated to the competition result, and the contribution degree is negatively correlated to the number of rounds played. For example, the designated round-based competition can be baseball, archery, softball, table tennis, tennis, badminton, etc. In this embodiment, the competition member can only strive to improve the competition result in the number of rounds played, when the competition member has fewer of the number of rounds played (compared with an average number of rounds played), it can be inferred that the performance score of the competition member is obtained with fewer of the number of rounds played, so the competition member should obtain the higher contribution degree, and therefore the contribution degree is negatively correlated to the number of rounds played.

In one embodiment, the physical competition is a specified score-based competition, the appearance information is a number of appearances, the performance score is correlated to the competition result, and the contribution degree is negatively correlated to the number of appearances. For example, the designated score-based competition can be car racing, bicycle racing, horse racing, rowing, etc. In this embodiment, the competition member will obtain a specified number of appearances, and the competition member can only strive to improve the competition result in the number of appearances. Therefore, when the competition member has fewer of the number of appearances (compared with an average number of appearances), it can be inferred that the performance score of the competition member is obtained with fewer of the number of appearances, so the competition member should obtain the higher contribution degree, and therefore the contribution degree is negatively correlated to the number of appearances.

In addition, calculation of the contribution degree is not only correlated to the appearance time, the number of rounds played, and the number of appearances, but can also be correlated to value, timing of appearance of the competition member, and can be designed according to actual requirements.

The user unit 30 is provided for the players to register, log in, amend and store a member information respectively, and the user unit 30 is provided for the players to respectively create a competition member list, and the competition member list is generated by selecting at least one of the competition members by the player.

In one embodiment, each of the competition members is given a selection point, the player needs to pay a competition point when creating the competition member list, and the competition point is a sum of the selection points of all the competition members in the competition member list. In more detail, the player needs to obtain a game point exceeding the competition point in advance before being able to pay the competition point when creating the competition member list.

In one embodiment, the competition point that the player can pay has an upper limit value. When the upper limit value exists, the player cannot only select the competition member who has performed well in the past. In other words, the player cannot spend a lot of money as a selecting means to achieve good results, instead the player needs to put effort into researching all the competition members to make the best choice, so that the different players can compete under fair conditions, thus increasing a playability of the competition game.

In one embodiment, the competition point that the player can pay has a lower limit value. The lower limit value is a threshold for the player to participate in the competition game, that is, the minimum competition point that the player has to pay each time the player plays the competition game, thereby ensuring an operating profit of the industry.

The statistics unit 40 corrects the performance score of the competition member based on a positive correlation with the contribution degree of each of the competition members to generate a weighted score for the competition member. In addition, the statistics unit 40 statistically calculates the weighted scores of all the competition members in each of the competition member lists, thereby generating a total score for each of the competition member lists, and performing ranking according to the total score, so that the associated players respectively obtain a competition ranking. In order to increase an excitement of the competition game, the statistics unit 40 generates a competition reward point based on a sum of the competition points paid by the players respectively, and the statistics unit 40 allocates the competition reward point to the players based on the competition ranking. In other words, the better the competition ranking of the player, the higher a proportion of the competition reward point the player can obtain.

The information storage unit 50 is used to store the game information, the competition information, the competition data, the member information, the competition member list and the competition ranking.

The server processing unit 60 connects to and controls operation of the display unit 10, the competition information unit 20, the user unit 30, the statistics unit 40 and the information storage unit 50, and performs transmission and exchange of the game information, the competition information, the competition data, the member information, the competition member list and the competition ranking.

Figure 3:
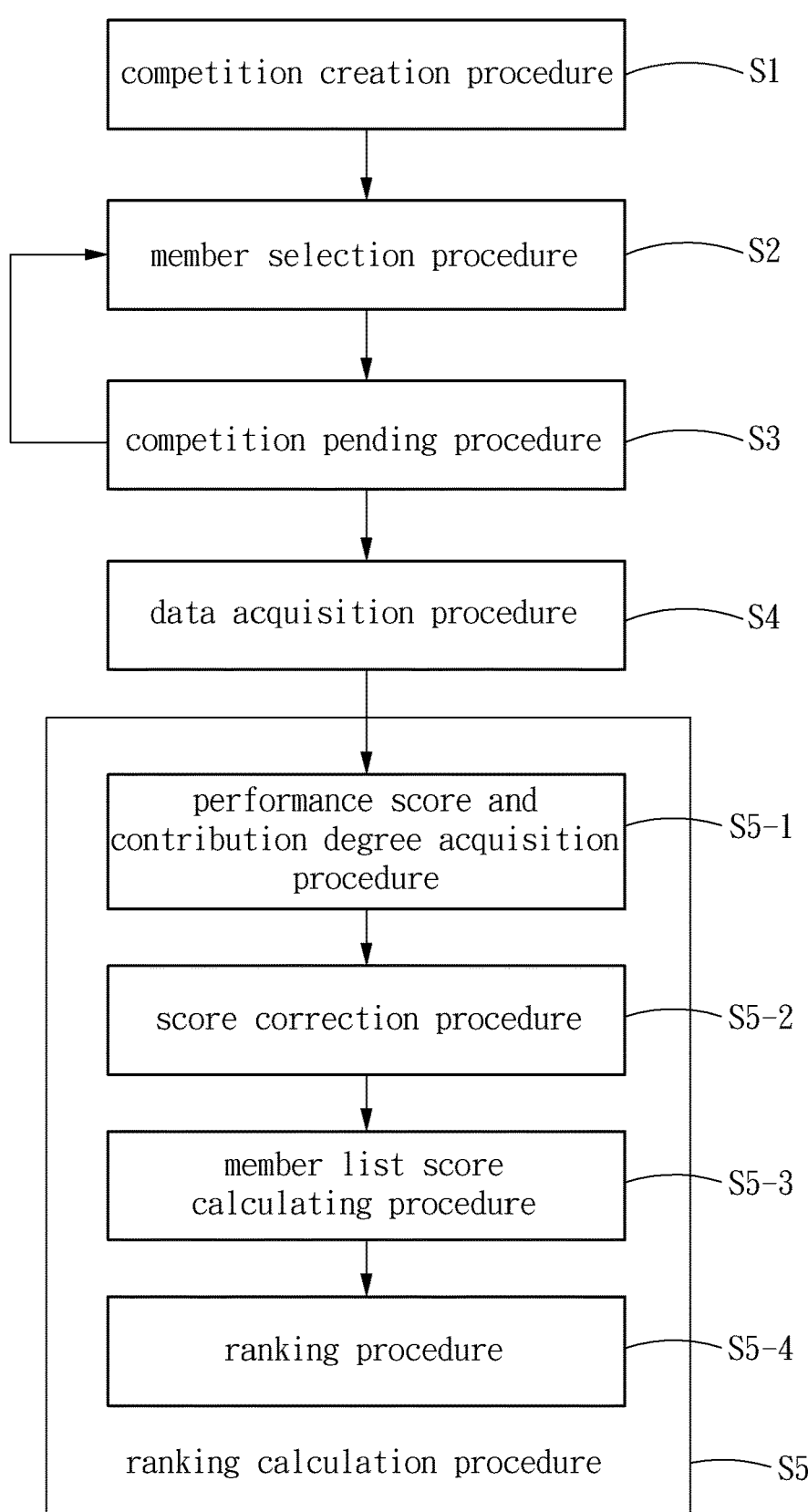
FIG. 3 is a flowchart of operation of the invention.

Please refer to FIG. 3. The invention further discloses an evaluation method of the competition evaluation system. Procedures of the evaluation method comprise a competition creation procedure S1, a member selection procedure S2, a competition pending procedure S3, a data acquisition procedure S4 and a ranking calculation procedure S5.

The competition creation procedure S1 obtaining the competition information of the physical competition to create the competition game; the member selection procedure S2 providing a selection time for the players to create the competition member list before starting the physical competition; the competition pending procedure S3 waiting for starting and ending of the physical competition; the data acquisition procedure S4 obtaining the competition data after ending of the physical competition; and the ranking calculation procedure S5 calculating and obtaining the total score of each of the competition member lists to enable the players to obtain the competition ranking respectively.

Further, the ranking calculation procedure S5 further comprises a performance score and contribution degree acquisition procedure S5-1, a score correction procedure S5-2, a member list score calculating procedure S5-3, and a ranking procedure S5-4.

The performance score and contribution degree acquisition procedure S5-1 obtaining the performance score and the contribution degree; the score correction procedure S5-2 correcting the performance score into the weighted score based on the contribution degree; the member list score calculating procedure S5-3 statistically calculating the weighted scores of all the competition members in each of the competition member lists to generate the total score; and the ranking procedure S5-4 ranking according to the total score to generate the competition ranking.

Summing up the above, advantages of the invention at least comprise:

1. the statistics unit corrects the performance score based on a positive correlation with the contribution degree to generate the weighted score of the competition member. The weighted score can practically reflect an actual performance of the competition member, so the competition ranking can be generated based on the weighted score, and the players need more solid sports knowledge and strategies to achieve good results, thereby making competition more enjoyable;

2. the competition point that the player can pay has the upper limit value, so that the different players can compete under fair conditions; and 3. the competition point that the player can pay has the lower limit value, thereby ensuring an operating profit of the industry.

What is claimed is:

1. A competition evaluation system providing a competition game for a plurality of players to play, the competition evaluation system comprising:

a display unit, configured to display a game information related to the competition game for viewing by the plurality of players;

a competition information unit, configured to obtain a competition information and a competition data of a pending physical competition, the competition information comprising a plurality of competition members participating in the physical competition, the competition data comprising a competition result and an appearance information of the competition members individually, wherein each of the plurality of competition members is given a performance score and a contribution degree based on the competition result and the appearance information;

a user unit, provided for the plurality of players to register, log in, amend and store a member information, the user unit provided for each of the plurality of players to create a competition member list generated by selecting at least one of the plurality of competition members by the player;

a statistics unit, configured to correct the performance score of each of the plurality of competition members based on a positive correlation with the contribution degree of the competition member, and the statistics unit configured to generate a weighted score for each of the plurality of competition members, and the statistics unit configured to statistically calculate weighted scores of all of the plurality of competition members in the competition member list of each competition member list and generate a total score for each competition member list, and the statistics unit configured to rank according to the total score and provide a competition ranking for each associated players;

an information storage unit, configured to store the game information, the competition information, the competition data, the member information, the competition member list and the competition ranking; and a server processing unit, connecting to the display unit, the competition information unit, the user unit, the statistics unit and the information storage unit, and the server processing unit configured to control operations of the display unit, the competition information unit, the user unit, the statistics unit and the information storage unit, and to perform transmission and exchange of the game information, the competition information, the competition data, the member information, the competition member list and the competition ranking.

2. The competition evaluation system as claimed in claim 1, wherein each of the plurality of competition members is given a selection point, a competition point is required to be paid by each of the plurality of players when creating the competition member list, and the competition point is a sum of selection points of the plurality of competition members in the competition member list.

3. The competition evaluation system as claimed in claim 2, wherein the statistics unit generates a competition reward point based on a sum of the competition points paid by the players, and the statistics unit allocates the competition reward point to the players based on the competition ranking.

4. The competition evaluation system as claimed in claim 2, wherein the competition point paid by the player has an upper limit value.

5. The competition evaluation system as claimed in claim 2, wherein the competition point paid by the player has a lower limit value.

6. The competition evaluation system as claimed in claim 1, wherein the physical competition is a time-based competition, the appearance information is an appearance time, the performance score is correlated to the competition result, and the contribution degree is negatively correlated to the appearance time.

7. The competition evaluation system as claimed in claim 1, wherein the physical competition is a specified round-based competition, the appearance information is a number of rounds played, the performance score is correlated to the competition result, and the contribution degree is negatively correlated to the number of rounds played.

8. The competition evaluation system as claimed in claim 1, wherein the physical competition is a specified score-based competition, the appearance information is a number of appearances, the performance score is correlated to the competition result, and the contribution degree is negatively correlated to the number of appearances.

* * * * *